United States Patent [19]

Schon et al.

[11] 3,854,981

[45] Dec. 17, 1974

[54] PROCESS FOR EMBEDDING OR ENVELOPING SOLID MATERIALS

[75] Inventors: Nikolaus Schon, Leverkusen; Hildegard Schnoring, Wuppertal-Elberfeld; Gottfried Pampus, Leverkusen, all of Germany

[73] Assignee: Bayer Aktiengesellschaft, Leverkusen, Germany

[22] Filed: Feb. 9, 1972

[21] Appl. No.: 224,938

Related U.S. Application Data

[63] Continuation of Ser. No. 24,803, April 1, 1970, abandoned.

[30] Foreign Application Priority Data

Apr. 5, 1969 Germany............................ 1917738

[52] U.S. Cl............ 117/62.1, 117/62.2, 117/100 A, 117/100 B, 117/105.5, 264/4, 264/7
[51] Int. Cl............................................. B44d 1/44
[58] Field of Search............. 117/62.1, 62.2, 100 A, 117/100 B, 105.5; 252/316; 264/4, 7

[56] References Cited
UNITED STATES PATENTS

| | | | |
|---|---|---|---|
| 3,748,277 | 7/1973 | Wagner...................... | 117/100 B X |
| 3,269,855 | 8/1966 | Moes et al. ........................ | 117/62.2 |
| 2,657,155 | 10/1953 | Lolkema............................. | 117/165 |
| 3,544,500 | 12/1970 | Osmond et al..................... | 260/29.6 |
| 3,691,090 | 9/1972 | Kitajima et al. ................. | 117/100 A |
| 3,549,555 | 12/1970 | Hiestand et al..................... | 252/316 |
| 3,257,229 | 6/1966 | Nielsen ............................ | 117/105.5 |
| 2,431,211 | 11/1947 | Vallandigham..................... | 252/358 |
| 3,640,741 | 2/1972 | Etes .................................. | 252/316 |
| 3,276,901 | 10/1966 | Lovell et al...................... | 117/105.5 |
| 2,599,771 | 6/1952 | Mol................................... | 260/209 |

*Primary Examiner*—William D. Martin
*Assistant Examiner*—Dennis C. Konopacki
*Attorney, Agent, or Firm*—Connolly and Hutz

[57] ABSTRACT

Solids or liquids are embedded or enveloped in a carboxyl-polymer by dispersing or dissolving the solid or liquid in an aqueous solution of the polymer and introducing the resulting solution or dispersion into a solution of an aluminium salt.

8 Claims, No Drawings

PROCESS FOR EMBEDDING OR ENVELOPING SOLID MATERIALS

CROSS REFERENCE TO RELATED APPLICATION

This application is a continuation of application Ser. No. 24,803 filed Apr. 1, 1970 and now abandoned.

BACKGROUND AND BRIEF SUMMARY OF THE INVENTION

Water-soluble macromolecules which contain carboxyl groups are known to react with polyvalent metal ions at certain pH values. In this reaction the molecular weight of the macromolecules is increased due to cross-linking taking place by linkage of molecule chains which results in gelling or flocculation. The ionic reaction of the polyvalent metal ions with the carboxyl groups proceeds very rapidly.

It is also known that solids or liquids may be embedded in form of small particles in high or low molecular weight compounds. Such solids or liquids may be enveloped by dispersing them in finely divided form in a melt of the high molecular or low molecular weight compound and lowering the temperature or by mixing them into a solution of the high or low molecular weight compound and removing the solvent.

Water-soluble polymers which contain carboxyl groups are generally difficult to melt. Their aqueous solutions are very viscous at higher concentrations and the water may be removed only under difficult conditions so that it is very difficult to embed small particles of solids or liquids in such carboxyl-containing polymers.

A process for embedding or enveloping solids or liquids in polymers which contain carboxyl or carboxylate groups has now been found wherein the solid or liquid to be embedded or enveloped is dispersed or dissolved in an aqueous solution of the polymer containing carboxyl or carboxylate groups, wherein the dispersion or solution formed is subsequently introduced in form of preformed particles into a solution of an aluminium salt to solidify the particles and wherein the solidified particles are recovered as microgranulates.

In the aluminium salt solution, the introduced particles develop a solid envelope constituting the reaction product of aluminium ion with the carboxyl- or carboxylate groups containing polymer. On removal of the water from the interior of the particles, shrinkage of the particles is observed but the solids or liquids remain in the interior of the polymer particles in finely divided form. This product is called a microgranulate and consists of small superficially or totally crosslinked polymer particles which enclose a liquid or solid. The liquids or solids may also to a certain extent be dissolved in the continuous polymer phase.

The solvent used in the present process, i.e., for dissolving the carboxyl- or carboxylate groups containing polymer and for dissolving the aluminium salt, is generally water, but a mixture of water with a lower alcohol such as ethanol or a ketone such as acetone may also be used.

DETAILED DESCRIPTION OF THE INVENTION

Water-soluble polymers containing carboxyl or carboxylate groups (in the following sometimes referred to as "polymers") which are suitable for the process of the invention include synthetic or natural high molecular weight polycarboxylic acids and their salts, e.g. polysaccharides such as carboxymethyl cellulose, alginates and pectins and their alkali metal salts statistic or alternating copolymers of maleic acid anhydride with ethylene, isobutylene, styrene or vinyl ethers which have been at least partly converted into the carboxyl-containing or carboxylate-containing form with opening of the carboxylic acid anhydride group by reaction with water or bases such as alkali metal hydroxide; homopolymers of acrylic acid or methacrylic acid and their alkali metal salts and corresponding copolymers, for example alkali metal salts and corresponding copolymers, for example with (meth)acrylic acid esters, (meth)acrylic acid amides, styrene. The polymer may be used as free acids, alkali metal salts, ammonium salts or amine salts or the form of their alkali. Carboxymethyl celluloses suitable for the present process preferably have a degree of substitution of between 0.4 and 1.5 carboxyl groups per anhydroglucose unit. Mixtures of such polymers may also be used.

The molecular weight of the polymers used in the enveloping process according to the invention should be sufficiently high because otherwise the mechanical strength of the particles or their permeability will be unsatisfactory. Polymers which have a viscosity about 10 centipoises at 25° C in an aqueous 2 percent solution at a pH 7 are generally suitable. However, it is preferable to use a polymer which has a viscosity above 1,000 centipoises, determined as above.

The concentration of the carboxyl or carboxylate-containing polymer in the solution used for the present process should be from about 0.05 to 5 percent by weight, preferably from 0.5 to 3 percent.

Suitable liquids or solids which may be embedded or enveloped by the present process are liquid or solid hydrophobic or hydrophilic inorganic or orgonic compounds or compositions. The following are examples from the large number of possible choices:

Pharmaceuticals and plant protective agents, foodstuffs and flavourings (e.g. spices, aromatic substances), dyes (e.g. inorganic or organic pigments, dye solutions), chemicals, lubricating, anti-friction or other oils, adhesives, bonding agents, etc. A mixture of substances, e.g. water-soluble active substances and emulsifiers, may also be embedded. The solids and liquids to be embedded are subsequently referred to as "compounds." This term is understood to include compositions and mixtures. Such solids or liquids are usually applied in amounts of from 99 to 5 percent by weight, preferably 98 to 50 percent based on the mixture of solid or liquid and polymer (taken as dry weight).

When embedding a hydrophobic compound, a dispersion or an emulsion of the selected solid or liquid in the solution of the polymer provided for enveloping is first prepared, using the usual dispersing or homogenising apparatus. The compound may also be enveloped as a solution in a water immiscible organic solvent, which solution is then dispersed in the solution of the polymer. A water-soluble compound may also be embedded by the process according to the invention, when applied as a reverse emulsion in a water immiscible organic solvent. Alternatively, the water-soluble substance to be embedded may be dissolved in the polymer solution and this solution then introduced in form of preformed particles into the aluminium salt solution.

When water is subsequently evaporated from the microgranulate particles, the water-soluble compound may recrystallise, embedded in the polymer which constitutes the continuous phase or a part of the total of the substance may remain dissolved in the polymer.

When embedding a water-soluble compound, its concentration in the solution containing the polymer should be as high as possible, also a hypersaturated solution may be used which contains the substance to be embedded dissolved and dispersed.

By suitable choice of the crystal size of the compound which is embedded pores in the microgranulate particles can be achieved since some crystals extend out of the envelope which can be dissolved away fairly rapidly.

The aluminium salt solution used for the present process preferably has a concentration of from 0.01 to 3, in particular from 0.05 to 1 mol, per litre.

The aluminium salts used may, for example, be aluminium sulphate, alum, aluminium chloride, basic aluminium chloride or aluminium nitrate or ammonium salts or organic acids such as aluminium acetate, basic aluminium acetate. The dispersion, the emulsion or the solution of the compound to be embedded or enveloped in the polymer solution, is now introduced in form of particles into the aluminium salt solution and thoroughly mixed by known methods (stirrers, circulating pumps, etc.). The above dispersion, emulsion or solution may also be injected into the aluminium salt solution, and the jet entering the solution is subdivided into small, very compact particles by turbulent flow or by mechanical action. According to a preferred embodiment, the dispersion, emulsion or solution of the compound to be enveloped in the polymer solution is first sprayed in air by means of a one compound or two compound nozzle, so that preformed particles having a well defined diameter are obtained which are then introduced into the surface of the aluminium salt solution with stirring or agitation.

In spraying on to the surface of the aluminium salt solution, care should be taken to choose an optimum distance between the nozzle outlet and the surface of the aluminium salt solution at which spherical particles are formed. If the distance is too small, large and sometimes coherent drops are formed which on contact with the surface of the aluminium salt solution partly disintegrate so that the particle size range becomes too broad. If the distance is too great, the particles are not spherical but distorted.

The size of the primary particles depends not only on the viscosity of the solution or dispersion but also on the diameter of the nozzles and the pressure at which the solution or dispersion is delivered through the nozzles. At a given nozzle diameter, the size of the primary particle is reduced when the spraying pressure is increased.

The reaction between the carboxyl- or carboxylate-containing polymer and the aluminium ions to form a solid envelope round the particles proceeds generally at a pH value of between 2 and 10. This range depends, to a certain extent, on the polymer used and may also deviate slightly. This, however, can rapidly be determined experimentally in each individual case. The reaction is fastest and most complete at a pH value of between 4 and 7. This range applies practically to any polymer which may be used in this context. Formation of the envelopes round the particles may, in principle, take place at a temperature of between 0° and 100° C but the temperature generally employed is between 15° and 50° C.

Since formation of the solid envelope takes place very quickly, the microgranulate particles can be removed immediately after introduction into the aluminium solution, e.g. by filtration or by centrifuging. The envelopes of the particles are so firm that further processing as described below can safely be carried out under industrial conditions.

After removal from the aluminium salt solution, the microgranulate particles containing enclosed solid or liquid may be washed and dried. They are advantageously kept in motion, e.g. by vibration or in a fluidised bed. The drying temperature is generally between 30° and 120° C and should consider the properties of the enveloped solid or liquid (boiling point, melting point, decomposition). The particles very rapidly lose water and any solvent present from the envelope layer as well as from the interior, whereas embedded liquids which make up the core are substantially retained. The particles size is reduced according to the quantity of water lost.

Size and shape of the microgranulate particles therefore depend mainly on the manner in which the particles are introduced into the aluminium salt solution, on the ratio of the enveloping polymer to the embedded compound — it is difficult to achieve a ratio of less than 1 percent of the enveloping polymer to the compound embedded — and the concentration of the compound to be enveloped in the dispersion, emulsion or solution used which contains enveloping polymer. The microgranulate particle size which can be obtained is between 50 $\mu$ and several millimetres, especially between 50 $\mu$ und 3 mm. The size of the embedded particles depends on the manner in which the compounds are distributed in the solution of the polymer. Particle sizes, e.g. in the order of 1 $\mu$ can quite easily be obtained. As the water evaporates from the microgranulate capsules, water-soluble compounds in the interior generally crystallise in a very finely divided form.

Wet microgranulate particles removed from the aluminium salt solution as well as dry microgranulate particles may be covered with an additional envelope or coating, e.g. of paraffin, sugar or powder, etc., and used in this form.

In principle, a cross-linking reaction also takes place between other polyvalent metal ions and water-soluble carboxyl or carboxylate groups containing polymers but such products are less suitable for enveloping particles in the present process. Either the envelopes are too bulky or too much in the nature of gels or else the reaction conditions are less advantageous, e.g. the reaction may take place only within a narrow pH range or the metal ions may only react at a very high concentration.

Aluminium ions are even much more effective than other trivalent metal ions and especially more than bivalent metal ions so that aluminium salt solution of low concentration may be used. Moreover the outstanding activity of aluminium salts is reflected in a low molar ratio of aluminium to carboxyl or carboxylate groups for effective formation of solid envelopes. The microgranulate particles produced by the process according to the invention do not contain aluminium salt in their interior so that the present process can also be used for embedding compounds which are sensitive to aluminium.

If the microgranulate particles contain liquids, these may be liberated by mechanical action such as compression or by an increase in pressure due to a change in the temperature.

The polymer constituting the walls of the microgranulate particles as well as the continuous phase in the interior can be redissolved in an acidic or an alkaline medium, i.e., outside the pH range of from about 2 to 10. At least the wall permeability may be influenced by changing the pH, i.e., the contents of the particles may also be liberated by chemical means. This controlled liberation of embedded compounds is of great interest for pharmacological application. The retention effect which can be achieved in this way, i.e., slow, controlled liberation of embedded active compounds, is also of very great importance in the field of plant protection. The possibility of dissolving the coatings or the continuous phase or of rendering them permeable depends also on the nature of the polymer (e.g. hydrophobic monomer units, carboxyl or carboxylate group content, etc.) and on its molecular weight. In general low carboxyl or carboxylate group contents and high molecular weights provide for more resistant particles.

EXAMPLE 1

25 Parts of polybutene oil (viscosity 60 cP) are emulsified in 70 parts of a 1 percent solution of a sodium salt of a carboxymethyl cellulose which has a degree of substitution of from 0.7 to 0.85 carboxyl groups per anhydroglucose unit (size of drops from 10 to 30 $\mu$). A 1 percent solution of sodium carboxymethyl cellulose has a viscosity of 2,000 cP at 25° C. Using a nozzle of internal diameter 0.2 mm at an expulsion pressure of 2 excess atmospheres, this emulsion is atomised into 200 parts of a 0.1 molar aluminium sulphate solution which has been thoroughly mixed by a stirrer, the nozzle outlet being situated 15 cm above the surface of the aluminium sulphate solution. The droplets dipping into the aluminium sulphate solution are immediately coated with a solid envelope. Spherical particles which have a diameter of about 2 mm are formed; they can be removed from the aluminium solution between ½ to 2 minutes after formation, washed in water and dried at 30°.C in a fluidised bed. After drying, 26 parts of pourable spheres having an average diameter of 1.2 mm are obtained.

EXAMPLE 2

25 parts of polybutene oil (viscosity 60 cP) are emulsified in 70 parts of a 1.3 sodium alginate solution which has a viscosity of about 6,000 CP at 20° C. The emulsion has a droplet size of 10 to 30 $\mu$. Using a nozzle (internal diameter 0.2 mm, expulsion pressure 4 excess atmospheres), this emulsion is dropped into 200 parts of a 0.1 molar solution of aluminium sulphate which is fixed with a stirrer (height of the fall of droplets 20 cm). The droplets dipping into the solution immediately harden on the surface. The small spherical particles are removed, washed with water and dried in a stream of air at 30° to 35° C. 27 Parts of slightly flattened, spherical particles which have a diameter of about 0.5 mm are obtained. On breaking up the particles, it is found that the oil droplets are embedded in the mass of carboxymethyl cellulose.

EXAMPLE 3 a. 0.5 Part of acetylsalicylic acid of particle size 300 400 $\mu$ is dispersed in 45 parts of a 1 percent solution of sodium carboxymethyl cellulose as in Example 1. Using a nozzle of internal diameter 1 mm, the dispersion is dropped at a pressure of 1 excess atmosphere into 200 parts of a 0.1 molar solution of aluminium sulphate which is stirred. The spherical particles dipping into the solution are immediately coated with a solid envelope. After 4 minutes in the solution, the spherical particles are separated, washed with water and dried in an air stream at 35° C. 1 Part of a pourable granulate which has an average particle diameter of 1.5 mm is obtained.

b. In another experiment, the same quantity of acetylsalicylic acid but having a particle size of 50 to 100 $\mu$ was dispersed and dropped into the aluminium solution using a nozzle of internal diameter 0.3 mm at a pressure of 3 excess atmospheres (distance of nozzle from solution 15 cm). The same quantity of granulate was obtained after the drying. It had a particle size of from 0.5 to 0.7 mm.

Whereas in experiment a) acetylsalicylic acid crystals project from the surface of the particles, the granulates from experiment b) have a practically closed surface inside which the crystals are individually embedded.

EXAMPLE 4 a. 0.5 Part of the compound:

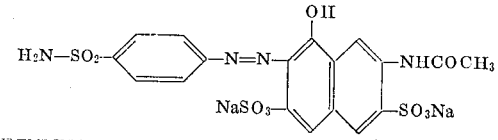

is dissolved in 40 parts of a 1 percent sodium carboxymethyl cellulose as in Example 1 which has a pH of from 7 to 7.5 The solution is dropped into a stirred 0.1 molar aluminium sulphate solution (height of fall 10 cm) from a nozzle of internal diameter 0.25 mm at a pressure of 4 excess atmospheres. The primary particles (diameter about 0.8 mm) are filtered off, washed with water and dried in an air stream at from 30° to 35° C. 0.96 Part of a granulate (diameter 0.3 to 0.5 mm) is obtained, the particles of which have minute crystals embedded in the interior.

b. 40 Parts of a 1.3 percent sodium alginate solution (the same compound as in Example 2), were used instead of a carboxymethyl cellulose solution. A pourable granulate having an average particle size of from 0.3 to 0.5 mm was obtained under the same conditions as under 4a).

EXAMPLE 5

0.7 Part of styrene maleic acid anhydride copolymer (limiting viscosity in dimethyl formamide 4.6) are stirred in 69 parts of water at 30° C. 10 percent Sodium hydroxide solution is added portionwise with stirring in such an amount that a clear solution of pH 7 is obtained. 25 Parts of polybutene oil (viscosity 60 cP) are dispersed in this solution at 20° C so that an emulsion having particle sizes of between 10 to 50 $\mu$ is formed.

The emulsion is introduced at a pressure of 2 excess atmospheres into 200 parts of a 0.15 molar aluminium sulphate solution through a nozzle (internal diameter 0.2 mm). The immersed spherical particles immediately become coated with a solid envelope. It is sufficient to leave them in the solution for from 30 to 60 seconds. The particles are washed and are dried at 35° C (air stream). 27 Parts of spherical particles having an average particle size of 1.4 mm are obtained.

EXAMPLE 6

1.05 Parts of a copolymer of 80 parts of methacrylic acid and 20 parts of methyl methacrylate (intrinsic viscosity in dimethyl formamide 2.5) are stirred in 68 parts of water, and a 10 percent sodium hydroxide solution is added at 35° to 40° C until a viscous solution is obtained (pH 8). 25 Parts of polybutene oil (viscosity 60 cP) are emulsified in this solution at 20° C (particle size 5 to 30 $\mu$). This emulsion is injected through a nozzle (internal diameter 0.25 mm, expulsion pressure 4 excess atmospheres) into 150 parts of a 0.15 molar aluminium sulphate solution which is being stirred. The spherical particles which rapidly become coated with a solid layer are worked up as usual. 28 Parts of pourable, spherical particles having an average particle size of 0.6 mm are obtained.

EXAMPLE 7

The procedure is the same as in Example 1 but using 70 parts of a 4 percent solution of a sodium salt of a carboxy-methyl cellulose. The sodium carboxymethyl cellulose has a degree of substitution of from 0.65 to 0.75 carboxylate groups per anhydroglucose unit, and the viscosity of a 2 percent solution measured according to Hoppler at 20° C is 30 cP. After the same method of working up, 30 parts of pourable, spherical particles having an average diameter of 1.3 mm are obtained.

We claim:
1. Process for embedding or enveloping a solid or liquid in a polymer containing carboxy or carboxylate groups, said process comprising dispersing or dissolving said solid or liquid in an aqueous solution of said polymer, atomizing the resulting dispersion or solution to thereby form small spherical particles thereof and introducing said atomized particles into an aqueous solution of an aluminum salt to thereby crosslink said polymer and form solid envelopes about said particles and recovering resulting particles as a microgranulate.

2. Process according to claim 1 wherein said solid or liquid is a pharmaceutical, a plant protective agent, a spice, a dyestuff, an oil or an adhesive.

3. Process according to claim 1 wherein said liquid is a solution of a solid in a water-immiscible solvent.

4. Process according to claim 1 wherein said solid or liquid is present in an amount of from 99 to 5 percent by weight based on the dry of the mixture of solid or liquid and polymer.

5. Process according to claim 1 wherein said polymer has a molecular weight corresponding at least to a viscosity of 10 centipoise at 25° C in 2 percent aqueous solution.

6. Process according to claim 1 wherein the aqueous polymer solution has a concentration of from 0.05 to 5 percent by weight.

7. Process according to claim 1 wherein the polymer is a synthetic or natural high molecular weight polycarboxylic acid, its alkali metal salt, ammonium salt or amine salt.

8. Process according to claim 1 wherein said aqueous solution of an aluminium salt has a concentration of 0.01 to 3 mols/litre.

* * * * *